US008261916B2

(12) United States Patent
Enomoto

(10) Patent No.: US 8,261,916 B2
(45) Date of Patent: Sep. 11, 2012

(54) PAPER SORTING APPARATUS, AND METHOD AND COMPUTER READABLE MEDIUM THEREFOR

(75) Inventor: Katsunori Enomoto, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 475 days.

(21) Appl. No.: 12/205,226

(22) Filed: Sep. 5, 2008

(65) Prior Publication Data

US 2009/0079128 A1    Mar. 26, 2009

(30) Foreign Application Priority Data

Sep. 21, 2007    (JP) ................. 2007-245472

(51) Int. Cl.
*B07C 5/00* (2006.01)
(52) U.S. Cl. ................ 209/559; 209/552; 382/112
(58) Field of Classification Search ............ 209/552, 209/559, 576, 580, 939; 382/112
See application file for complete search history.

(56) References Cited

U.S. PATENT DOCUMENTS

| 5,761,600 | A  | * | 6/1998  | Murata        | 399/403  |
| 5,971,519 | A  | * | 10/1999 | Horikoshi     | 347/16   |
| 6,301,013 | B1 | * | 10/2001 | Momose et al. | 358/1.15 |
| 7,643,171 | B2 | * | 1/2010  | Takahashi     | 358/1.18 |
| 7,782,508 | B2 | * | 8/2010  | Kondo         | 358/538  |
| 7,831,927 | B2 | * | 11/2010 | Tsuzuki et al.| 715/810  |
| 8,081,347 | B2 | * | 12/2011 | Tamada et al. | 358/3.28 |
| 2002/0034399 | A1 |   | 3/2002  | Matsumoto et al. | |
| 2004/0252314 | A1 |   | 12/2004 | Takahashi     |          |
| 2009/0080007 | A1 | * | 3/2009  | Enomoto       | 358/1.9  |

FOREIGN PATENT DOCUMENTS

| JP | 11-240226    |   | 9/1999  |
| JP | 2001-051555  | A | 2/2001  |
| JP | 2001-226014  | A | 8/2001  |
| JP | 2001-226031  | A | 8/2001  |
| JP | 2002-162880  | A | 6/2002  |
| JP | 2002-311753  |   | 10/2002 |
| JP | 2003-025679  |   | 1/2003  |
| JP | 2004-054088  | A | 2/2004  |
| JP | 2004-302752  |   | 10/2004 |

OTHER PUBLICATIONS

EP Search Report dtd Feb. 6, 2009, EP Appln. 08013543.7.
JP Office Action dtd Sep. 8, 2009, JP Appln. 2007-245472, English translation.
EP Office Action mailed Apr. 30, 2012, EP Appln. 08013543.7.

* cited by examiner

*Primary Examiner* — Joseph C Rodriguez
(74) *Attorney, Agent, or Firm* — Banner & Witcoff, Ltd.

(57) ABSTRACT

A paper sorting apparatus includes a scanning unit configured to scan an image printed on a paper, a printing ratio determining unit configured to determine a printing ratio as a ratio of an area of the printed image as scanned by the scanning unit to a whole area on the paper with the printed image thereon, a classification determining unit configured to determine a recycling classification of the paper based upon the printing ratio determined by the printing ratio determining unit, and a sorting assist unit configured to assist sorting of the paper in accordance with the recycling classification of the paper determined by the classification determining unit.

8 Claims, 8 Drawing Sheets

Index Sheet

No.1　　　No.2　　　No.3　　　No.4　　　No.5

No.6　　　No.7　　　No.8　　　No.9

| RECYCLING CLASSIFICATION LIST ||
|---|---|
| IMAGE COUNTER N | RECYCLABILITY |
| 1 | |
| 2 | ○ |
| 3 | ○ |
| 4 | ○ |
| 5 | |
| 6 | |
| 7 | ○ |
| 8 | |
| 9 | ○ |

FIG.6B

PAPER SORTING APPARATUS, AND METHOD AND COMPUTER READABLE MEDIUM THEREFOR

CROSS-REFERENCE TO RELATED APPLICATION

This application claims priority under 35 U.S.C. §119 from Japanese Patent Application No. 2007-245472 filed on Sep. 21, 2007. The entire subject matter of the application is incorporated herein by reference.

BACKGROUND

1. Technical Field

The following description relates to one or more paper sorting techniques to sort a printed paper based upon a recycling classification thereof.

2. Related Art

Recently, paper recycling has been emphasized more and more while global environmental issues have been exacerbated year by year. When a printed paper is recycled, the printed paper is required to be sorted in accordance with a recycling classification thereof previously determined based upon a printing ratio as a ratio of printed areas to a whole area on the printed paper. Thus, a technique has been proposed, in which when a desired image is printed on a paper, a recycling classification thereof is determined based upon a printing ratio of the image and a sort of the paper, and information on the recycling classification as determined is printed together with the image (for example, see Japanese Patent Provisional Publication No. 2004-302752).

SUMMARY

However, the aforementioned technique cannot make determination of the recycling classification for a paper that has already been printed by another printing device.

Aspects of the present invention are advantageous in that one or more improved paper sorting apparatuses are provided that make it possible to determine a recycling classification of an already-printed paper and appropriately sort the paper based upon the recycling classification as determined.

According to aspects of the present invention, there is provided a paper sorting apparatus, which includes a scanning unit configured to scan an image printed on a paper, a printing ratio determining unit configured to determine a printing ratio as a ratio of an area of the printed image as scanned by the scanning unit to a whole area on the paper with the printed image thereon, a classification determining unit configured to determine a recycling classification of the paper based upon the printing ratio determined by the printing ratio determining unit, and a sorting assist unit configured to assist sorting of the paper in accordance with the recycling classification of the paper determined by the classification determining unit.

It is noted that the aforementioned sorting assist unit is a unit configured to assist a user to sort the paper in accordance with the recycling classification of the paper as determined by the classification determining unit. For example, the sorting assist unit may include an output unit configured to output the recycling classification of the paper determined by the classification determining unit so as to assist the user to sort the paper in accordance with the recycling classification thereof. Alternatively or optionally, the sorting assist unit may include a paper feeding stopping unit configured to stop a paper feeding operation based upon the recycling classification as determined by the classification determining unit so as to assist the user to sort the paper in accordance with the recycling classification thereof.

In some aspects of the present invention, the scanning unit scans an image printed on a paper, and the printing ratio determining unit determines a printing ratio as a ratio of an area of the printed image as scanned by the scanning unit to a whole area on the paper with the printed image thereon. Then, the classification determining unit determines a recycling classification of the paper based upon the printing ratio determined by the printing ratio determining unit, and the sorting assist unit assists sorting of the paper in accordance with the recycling classification of the paper determined by the classification determining unit. Thus, in some aspects, the scanning unit scans an image as already printed on the paper. Then, based upon the scanned image, the printing ratio is calculated and the recycling classification of the paper is determined. Therefore, it is possible to appropriately determine the recycling classification even for an already-printed paper. Additionally, since the sorting assist unit assists the user to sort the paper, the user can appropriately sort the already-printed paper in accordance with the recycling classification thereof.

According to another aspect of the present invention, there is provided a paper sorting method, which includes a scanning step of scanning an image printed on a paper, a printing ratio determining step of determining a printing ratio as a ratio of an area of the printed image as scanned in the scanning step to a whole area on the paper with the printed image thereon, a classification determining step of determining a recycling classification of the paper based upon the printing ratio determined in the printing ratio determining step, and a sorting assist step of assisting sorting of the paper in accordance with the recycling classification of the paper determined in the classification determining step.

With the paper sorting method configured as above, the same effects as the aforementioned paper sorting apparatus can be provided.

According to a further aspect of the present invention, there is provided a computer readable medium having computer readable instructions stored thereon, which cause a computer to perform a scanning step of scanning an image printed on a paper, a printing ratio determining step of determining a printing ratio as a ratio of an area of the printed image as scanned in the scanning step to a whole area on the paper with the printed image thereon, a classification determining step of determining a recycling classification of the paper based upon the printing ratio determined in the printing ratio determining step, and a sorting assist step of assisting sorting of the paper in accordance with the recycling classification of the paper determined in the classification determining step.

With the computer readable medium configured as above, the same effects as the aforementioned paper sorting apparatus can be provided.

BRIEF DESCRIPTION OF THE ACCOMPANYING DRAWINGS

FIG. 6B is a recycling classification list in which a paper represented by each image counter N is associated with recyclability thereof in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

(Overall Configuration of Multi-Function Peripheral)

Figure 1:
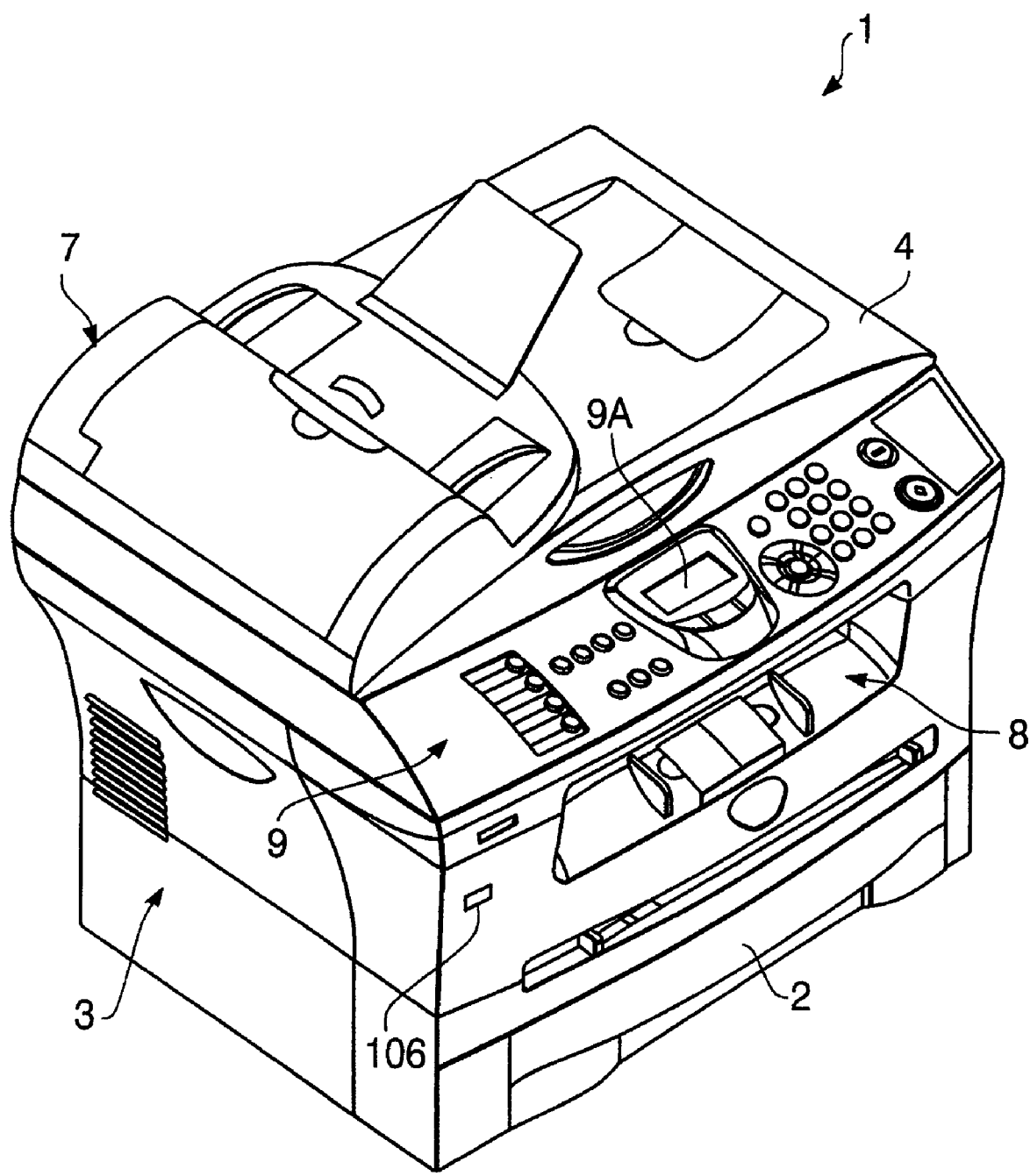
FIG. 1 is an external view schematically showing a configuration of a multi function peripheral (MFP) in an embodiment according to one or more aspects of the present invention.

FIG. 1 is an external view schematically showing a multi-function peripheral (MFP) 1 as a paper sorting apparatus in an embodiment according to aspects of the present invention. As shown in FIG. 1, the MFP 1 is provided with a paper feed tray 2 configured to feed a recording paper P (see FIG. 3) on which an image is formed, a main body 3 configured to form an image on the recording paper P fed from the paper feed tray 2, and a main body cover 4 supported by the main body 3 in an openable and closable manner so as to completely cover an upper face of the main body 3.

The main body 3 includes therein a scanning unit 5 (see FIG. 2) configured to scan an image formed on an original document G and an image forming unit 6 (see FIG. 3) configured to form an image on the recording paper P fed from the paper feed tray 2. The scanning unit 5 is a commonly-known one that scans an image formed on the original document G which is placed on a scanning surface 3A (see FIG. 2) provided on the upper face of the main body 3 or carried by an automatic document feeding unit 7 with a configuration described below. Additionally, the image forming unit 6 is configured as a commonly-known printer engine that forms an image in an electrophotographic method with yellow toner, magenta toner, cyan toner, and black toner. The image forming unit 6 forms an image on the recording paper P on a sheet-by-sheet basis. Further, an operation panel 9 is provided on the upper face of the main body 3, which includes a liquid crystal display (LCD) 9A and various kinds of buttons.

(Configuration of Main Body Cover and Scanning Unit)

Figure 2:
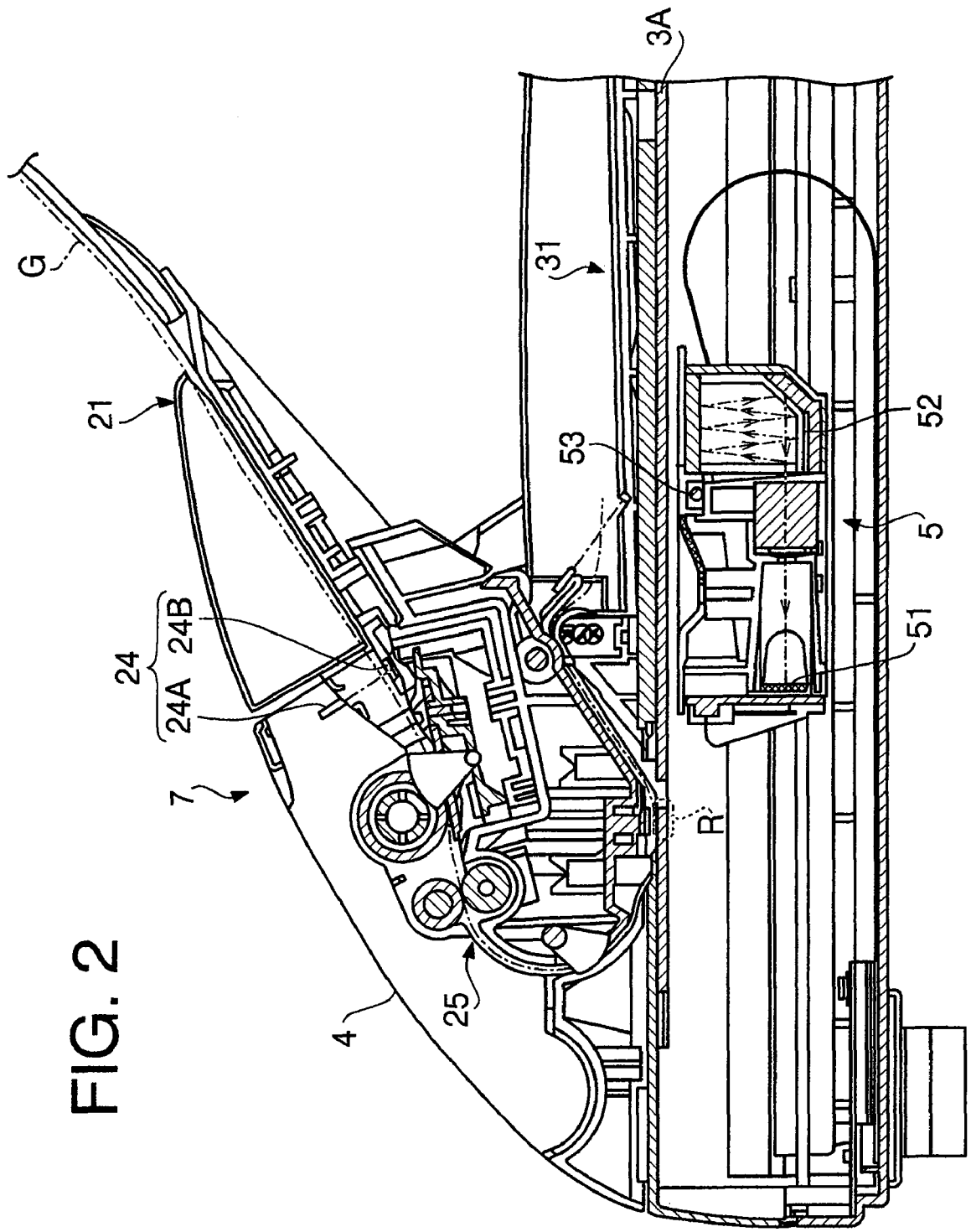
FIG. 2 is a cross-sectional view schematically showing a configuration of the MFP including a main body cover and a scanning unit in the embodiment according to one or more aspects of the present invention.

FIG. 2 is a cross section schematically showing the main body cover 4 and the scanning unit 5. As shown in FIG. 2, the main body cover 4 includes a loading portion 21 that loads thereon the original document G which is about to be scanned by the scanning unit 5, an accumulating portion 31 on which the original document G scanned by the scanning unit 5 is accumulated, and a carrying unit 25 that carries the original document G from the loading portion 21 to the accumulating portion 31 via the scanning surface 3A (namely, which carries the original document G to the accumulating portion 31 after letting the scanning unit 5 held in a scanning position R in automatic document feeding scan the original document G). Thus, the automatic document feeding unit 7 (so-called automatic document feeder ADF) is configured with the loading portion 21, accumulating portion 31, and carrying unit 25.

In addition, as illustrated in FIG. 2, the scanning unit 5 is provided with a light source 53 configured to emit light toward the original document G, an optical element group 52 configured to collect light reflected by the original document G, and an image sensor 51 for scanning an image (including colors) formed on the original document G. Namely, the scanning unit 5 is configured to scan the image on the original document G by emitting light from the light source 53, collecting the light reflected by the original document G with the optical element group 52, and detecting, with the image sensor 51, the reflected light collected.

Further, the scanning unit 5 is configured to scan the original document G in such a position as to face the scanning position R and movable along a longitudinal direction of the main body 3 (right-to-left direction) parallel to the scanning surface 3A with a scanning unit driving mechanism (not shown).

Specifically, when scanning the original document G with the automatic document feeding unit 7, the scanning unit 5 is held in the position facing the scanning position R, and completely scans the original document G fed by the automatic document feeding unit 7. Further, when scanning the original document G placed so as to cover the scanning surface 3A (when being used as a so-called flatbed scanner), the scanning unit 5, which is being shifted by the scanning unit driving mechanism, completely scans the original document G placed on the scanning surface 3A.

On the loading portion 21, a document detecting sensor 24 is disposed, which detects whether the original document G is placed on the loading portion 21. The main body 3 includes a scanning surface detecting sensor (not shown) configured to detect whether the original document G is placed on the scanning surface 3A. The document detecting sensor 24 is an optical sensor configured with a light emitting portion 24A and a light receiving portion 24B. The light emitting portion 24A and the light receiving portion 24B are disposed to face each other such that the original document G placed on the loading portion 21 blocks light emitted by the light emitting portion 24A toward the light receiving portion 24B.

Therefore, in the document detecting sensor 24, when the original document G does not exist on the loading portion 21, the light emitted by the light emitting portion 24A is detected by the light receiving portion 24B. Thus, the light receiving portion 24B issues a light receiving signal with a high signal level. Meanwhile, when the original document G exists on the loading portion 21, the light is blocked by the original document G and is not detected by the light receiving portion 24B. Thus, the light receiving portion 24B issues a light receiving signal with a low signal level.

(Configuration of Image Forming Unit)

Figure 3:
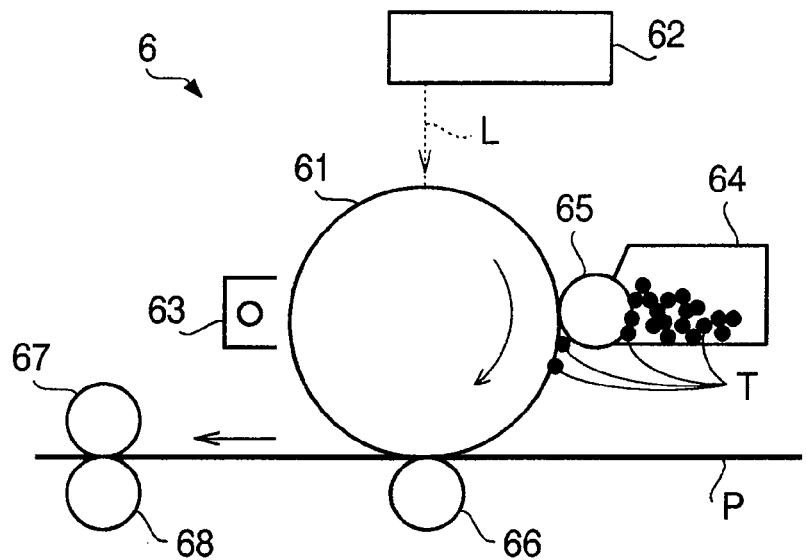
FIG. 3 is a schematic diagram showing a configuration of an image forming unit of the MFP in the embodiment according to one or more aspects of the present invention.

The image forming unit 6 is configured as shown in FIG. 3. Specifically, as shown in FIG. 3, the image forming unit 6 includes a photoconductive drum 61 configured to hold on a surface thereof an electrostatic latent image formed through exposure of laser light L and an exposing unit 62 configured to expose the surface of the photoconductive drum 61 with the laser light L. Additionally, the exposing unit 62 is provided with a laser diode (not shown) and a polygon mirror (not shown) and also has a commonly-known configuration for scanning and exposing the photoconductive drum 61 in a direction along a rotational axis of the photoconductive drum 61.

Further, the photoconductive drum 61 is configured to rotate in a direction indicated by an arrow in FIG. 3. Around the photoconductive drum 61, there are disposed a scorotron-type electrification control device 63 configured to charge the surface of the photoconductive drum 61 evenly, a developing roller 65 configured to make toner T as developer stored in a toner cartridge 64 adhere onto the surface of the photoconductive drum 61 and develop the electrostatic latent image, and a transcriptional roller 66 configured to transfer the toner T, which the developing roller 65 has made adhere onto the surface of the photoconductive drum 61, onto the recording paper P. Further, the recording paper P on which the image is formed through the transfer of the toner T is carried to between a heating roller 67 and a pressing roller 68, and the toner T transferred is fixed onto the recording paper P.

Additionally, it is not shown in FIG. 3, yet the image forming unit 6 is a tandem type laser printer provided with respective photoconductive drums 61 for four colors cyan (C), magenta (M), yellow (Y), and black (K). After toner images of the four colors are formed, the fixing operation is performed with the heating roller 67 and the pressing roller 68.

(Explanation of Control System)

Figure 4:
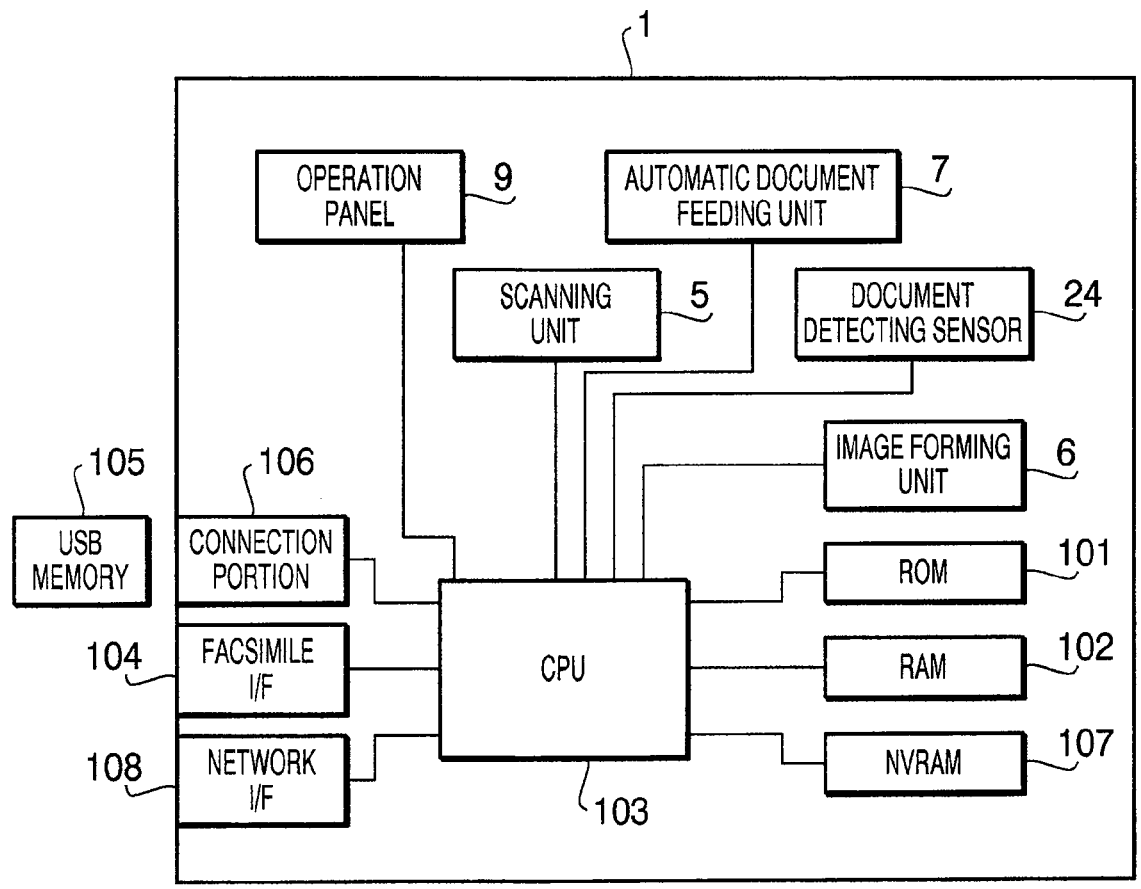
FIG. 4 is a block diagram schematically showing a control system of the MFP in the embodiment according to one or more aspects of the present invention.

FIG. 4 is a block diagram showing a configuration of a control system of the MFP 1. As shown in FIG. 4, The MFP 1 includes a network interface (network I/F) 108 through which the MFP 1 is connected with a network (not shown) such as a LAN, a facsimile interface (facsimile I/F) 104 through which the MFP 1 is connected with a telephone line, a connection portion 106 (see FIG. 1) configured such that a USB memory 105 is attached thereto or removed therefrom, a ROM 101 configured to store thereon processing programs for controlling various operations of the MFP 1, a RAM 102 configured to temporarily store thereon results of processes, a CPU 103 configured to execute the processing programs stored on the ROM 101, and an NVRAM (non-volatile memory) 107 configured to store thereon data required to be saved even when the MFP 1 is powered off. Further, the CPU 103 is connected with the aforementioned scanning unit 5, image forming unit 6, automatic document feeding unit 7, operation panel 9, and document detecting sensor 24.

(Control in Control System)

Figure 5:
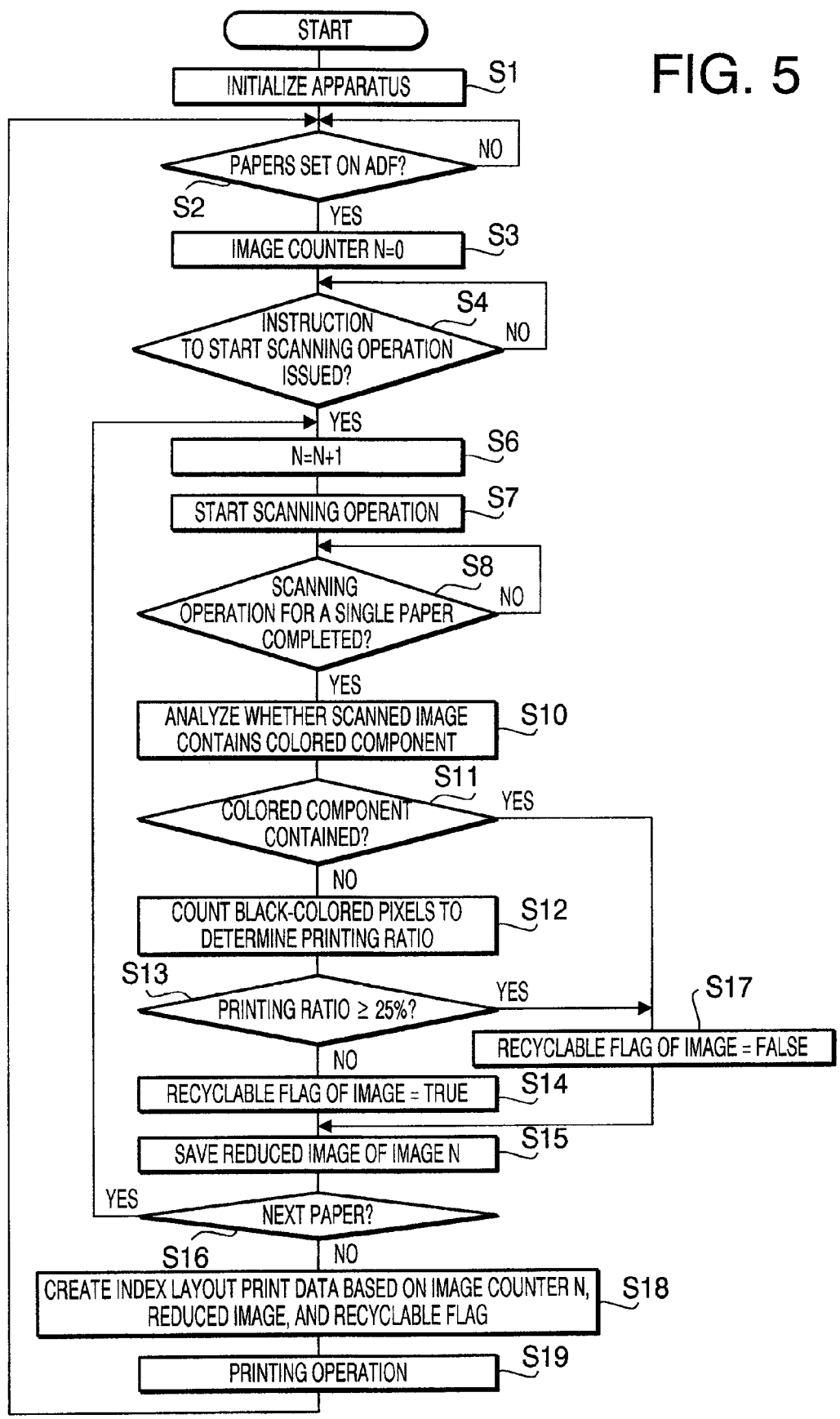
FIG. 5 is a flowchart showing a paper sorting process to be controlled by the control system in the embodiment according to one or more aspects of the present invention.

Subsequently, a paper sorting process to be executed by the CPU 103 based upon a program stored on the ROM 101 will be described. FIG. 5 is a flowchart showing a paper sorting process. The CPU 103 begins the paper sorting process based upon the program stored on the ROM 101 when a paper sorting mode is set through the operation panel 9.

As shown in FIG. 5, in the present process, firstly in S1, initializing operations are performed, which includes warming-up of the photoconductive drum 61 and below-mentioned reset operations for resetting various flags. In a subsequent step S2, it is determined through the document detecting sensor 24 whether papers to be sorted are set as the original document G on the automatic document feeding unit 7 (ADF). Until papers to be sorted are set on the automatic document feeding unit 7 (namely, while it is being determined that any papers to be sorted are not set on the automatic document feeding unit 7) (S2: No), the CPU 103 keeps waiting in a standby state. Meanwhile, when it is determined that papers to be sorted are set on the automatic document feeding unit 7 (S2: Yes), the present process goes to S3, in which an image counter N is reset to "0." In a subsequent step S4, it is determined whether an instruction to start a scanning operation is issued via the operation panel 9, and the CPU 103 keeps waiting in the standby state until the instruction to start the scanning operation is issued (S4: No).

When the instruction to start the scanning operation is issued (S4: No), the present process goes to S6, in which the image counter N is incremented by one. Then, in S7, the scanning operation of scanning a paper is started. Specifically, the automatic document feeding unit 7 is driven as described above, and the scanning unit 5 scans an image on the paper being carried. In S8, the CPU 103 keeps waiting in the standby state until the scanning operation is completed for a single paper (S8: No). Meanwhile, when the scanning operation is completed for a single paper (S8: Yes), the present process goes to S10, in which an analysis on whether the scanned image contains a colored component is made. Then, based upon the analysis, it is determined in S11 whether the scanned image contains a colored component.

When the scanned image is monochrome and does not contain any colored component (S11: No), the present process goes to S12, in which black-colored pixels (i.e., pixels in each of which a black component is set ON) are counted. In a subsequent step S13, it is determined whether a ratio of an area of the black-colored pixels (namely, a printed area) to a whole area on the paper is equal to or more than 25% (namely, whether the printing ratio is equal to or more than 25%). When it is determined that the printing ratio is less than 25% (S13: No), the present process goes to S14, in which a recyclable flag of an image on the paper corresponding to the image counter N (hereinafter referred to as an image N) is set to "TRUE." Then, the present process goes to S15, in which a reduced image of the image N is stored into a predetermined area of the RAM 102. In a subsequent step S16, it is determined whether there is a next paper on the loading portion 21. When it is determined that there is a next paper on the loading portion 21 (S16: Yes), the present process goes back to S6, in which the image counter is incremented by one, and thereafter the same steps are executed for the next paper.

Meanwhile, when it is determined that the image N contains a colored component (S11: Yes), or when it is determined that the printing ratio is equal to or more than 25% (S13: Yes) even though the image N is a monochrome image, the present process goes to S17, in which the recyclable flag of the image N is set to "FALSE." Then the present process goes to the aforementioned step S15. Thus, the present embodiment is adopted based upon an assumption that a recycling manufacture provides such a criterion that a paper, on which an image is monochrome and the printing ratio of the image is less than 25%, is recyclable as a recycled paper. Namely, the recyclable flag is set for a paper depending on the recyclability of the paper. It is noted that even though the recyclable flag for a paper is set to "FALSE," the paper may be recyclable. Additionally, the criterion for determining the recyclability of a paper may be a numerical value different from the aforementioned value, and the recyclable flag may have three or more levels of values.

Thus, by repeating the steps of S6 to S17, papers are sequentially carried with the automatic document feeding unit 7 (S7), the recyclability of each paper is determined (S10 to S17), and the present process goes to S18 after the steps are completed for all the papers (S16: No). In S18, index layout print data is created based upon the image counter N, data of the reduced image, and the value of the recyclable flag for each paper that are stored in association with each other in the steps S14, S15, and S17.

Figure 6A:
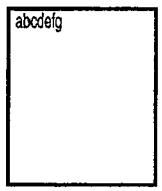
FIG. 6A is a schematic diagram showing index layout print data created in the paper sorting process in the embodiment according to one or more aspects of the present invention.
Figure 6A:
Figure 6A:
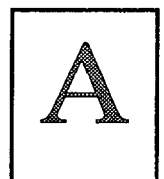
Figure 6A:
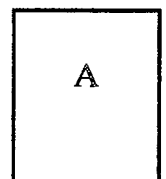
Figure 6A:
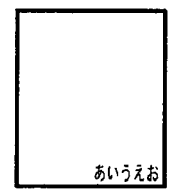
Figure 6A:
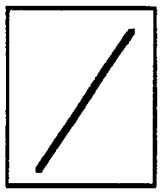
Figure 6A:
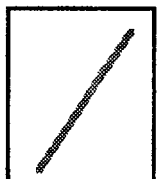
Figure 6A:
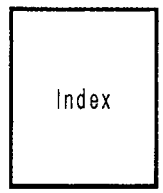
Figure 6A:
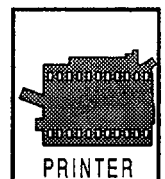

FIG. 6A is a schematic diagram exemplifying the index layout print data. In index layout printing, a number (No. 1, No. 2, . . . ) is given, depending on the image counter N, to the reduced image scanned from each paper. A prohibition sign is given to a paper determined not to be recyclable as a recycled paper. It is noted that any medium-colored image in FIG. 6A denotes a colored image. Namely, images of No. 3, No. 4, No. 7, and No. 9 are colored images and thus un-recyclable (see S11). Additionally, an image of No. 2, which is monochrome, yet has a high printing ratio, is un-recyclable (see S13).

Back to FIG. 5, when such index layout print data is created in S18, in a subsequent step S19, a printing operation on the recording paper P is performed by the image forming unit 6. Then, the present process goes to the aforementioned step S2, in which the CPU 103 keeps waiting in the standby state until papers are newly set on the automatic document feeding unit 7.

Thus, in the paper sorting process, by scanning an image printed on a paper with the scanning unit 5 (S7), it is determined whether the image is monochrome and whether the printing ratio is less than 25% (S10 to S13), and the recycling classification of the paper is determined based upon the above determination (S14 and S17). Therefore, it is possible to favorably sort an already-printed paper in accordance with a recycling classification therefor. Furthermore, in the above paper sorting process, when the reduced images are outputted in the index layout printing, the determination results on the recycling classifications are printed in association with the reduced images. Therefore, it is possible to visually grasp which paper is recyclable as a recycled paper.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

(Modifications)

For example, various ways to output the determination results on the recycling classifications may be possible. Specifically, a list of image counters N associated with respective recyclabilities may be outputted as shown in FIG. 6B. In FIG. 6B, a paper represented by an image counter N associated with a mark "○" is identified as recyclable. In this case, the output result is further concise.

Further, depending on the recyclability, the feeding operation by the automatic document feeding unit 7 may be stopped. Hereinafter, such a paper sorting process will be described with reference to FIGS. 7 and 8.

Figure 7:
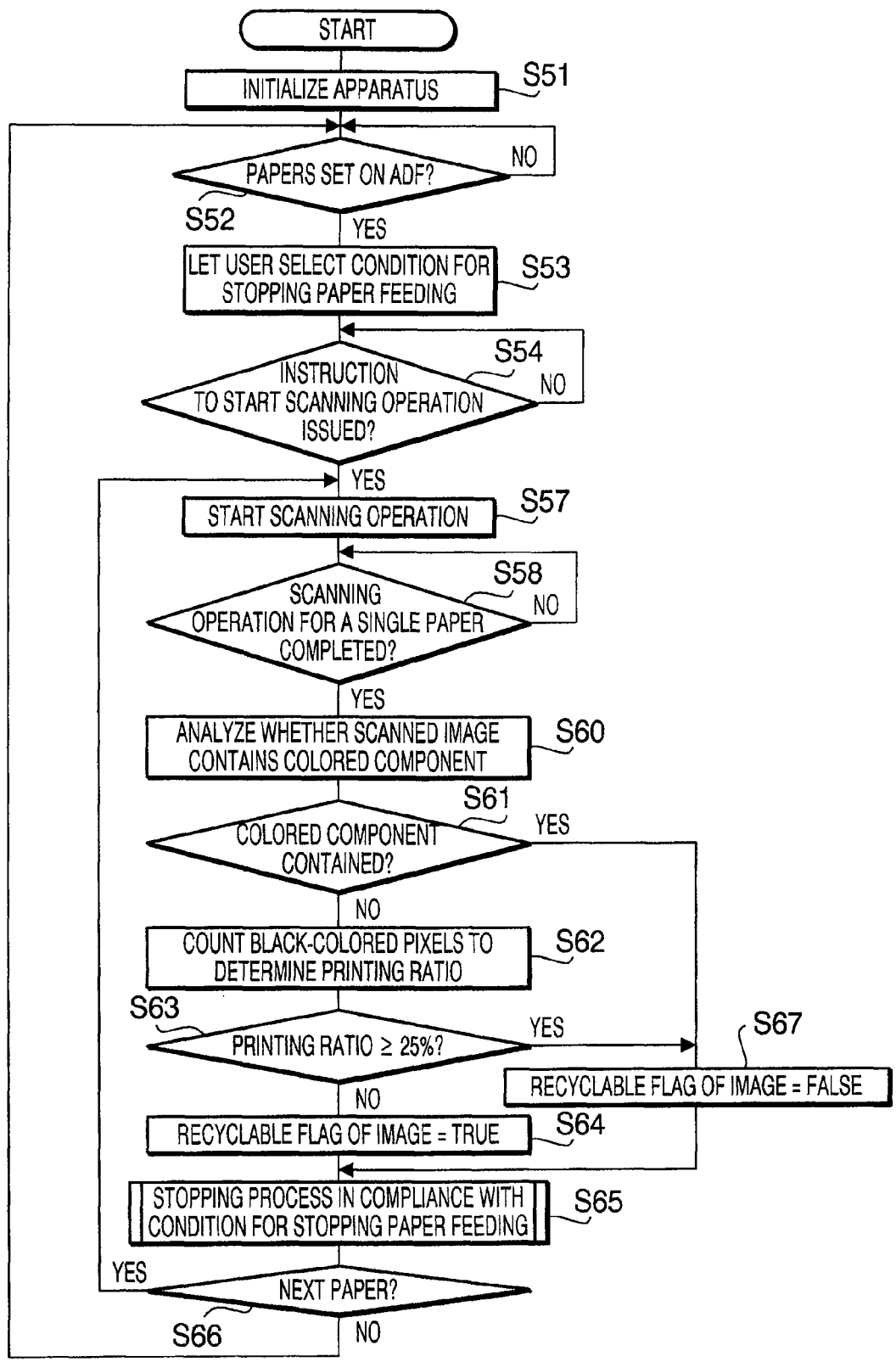
FIG. 7 is a flowchart of a paper sorting process in a modification according to one or more aspects of the present invention.

As shown in FIG. 7, in the present process, firstly in S51, initializing operations similar to S1 in the aforementioned embodiment are performed. In a subsequent step S52, the CPU 103 keeps waiting in the standby state until papers are set on the automatic document feeding unit (ADF) 7 (S52: No) in the same manner as S2. When papers are set on the automatic document feeding unit 7 (S52: Yes), the present process goes to S53, in which an operation of letting a user select a condition for stopping paper feeding via the operation panel 9. Specifically, there is displayed on the LCD 9A, an indication for letting the user select, as the condition for stopping paper feeding, either when a recyclable paper is detected or when an un-recyclable paper is detected. Then, one of them is set as the condition for stopping paper feeding by a user operation through the operation panel 9. The user may grasp to some extent what kind of information (image) is contained on a printed paper as a sorted target. In such a case, the user may be likely to know in advance whether there are many recyclable pages. Thereby, the present process is configured such that the condition for stopping paper feeding can be selected so as to lessen occasions to stop paper feeding. In a subsequent step S54, it is determined whether an instruction to start a scanning operation is issued via the operation panel 9, and the CPU 103 keeps waiting in the standby state until the instruction to start the scanning operation is issued (S54: No).

When the instruction to start the scanning operation is issued (S54: Yes), in steps of S57 to S64, the same operations as the aforementioned steps of S7 to S14 are performed. Specifically, the operation of scanning the paper is launched, and after waiting in the standby state until the scanning operation is completed for a single paper (S58), it is determined whether the analysis on whether the scanned image contains a colored component is made (S60).

As a result of the analysis in S60, when it is determined that the scanned image does not contain any colored component (S61: No), black-colored pixels (i.e., pixels in each of which a black component is set ON) are counted (S62). In a subsequent step S63, it is determined whether the printing ratio is equal to or more than 25%. When it is determined that the printing ratio is less than 25% (S63: No), the recyclable flag of the image is set to "TRUE" in S64, and the present process goes to S65.

Meanwhile, when it is determined that the image contains a colored component (S61: Yes), or when it is determined that the printing ratio is equal to or more than 25% (S63: Yes) even though the image is a monochrome image, the present process goes to S67, in which the recyclable flag of the image is set to "FALSE." Then, the present process goes to S65.

Figure 8:
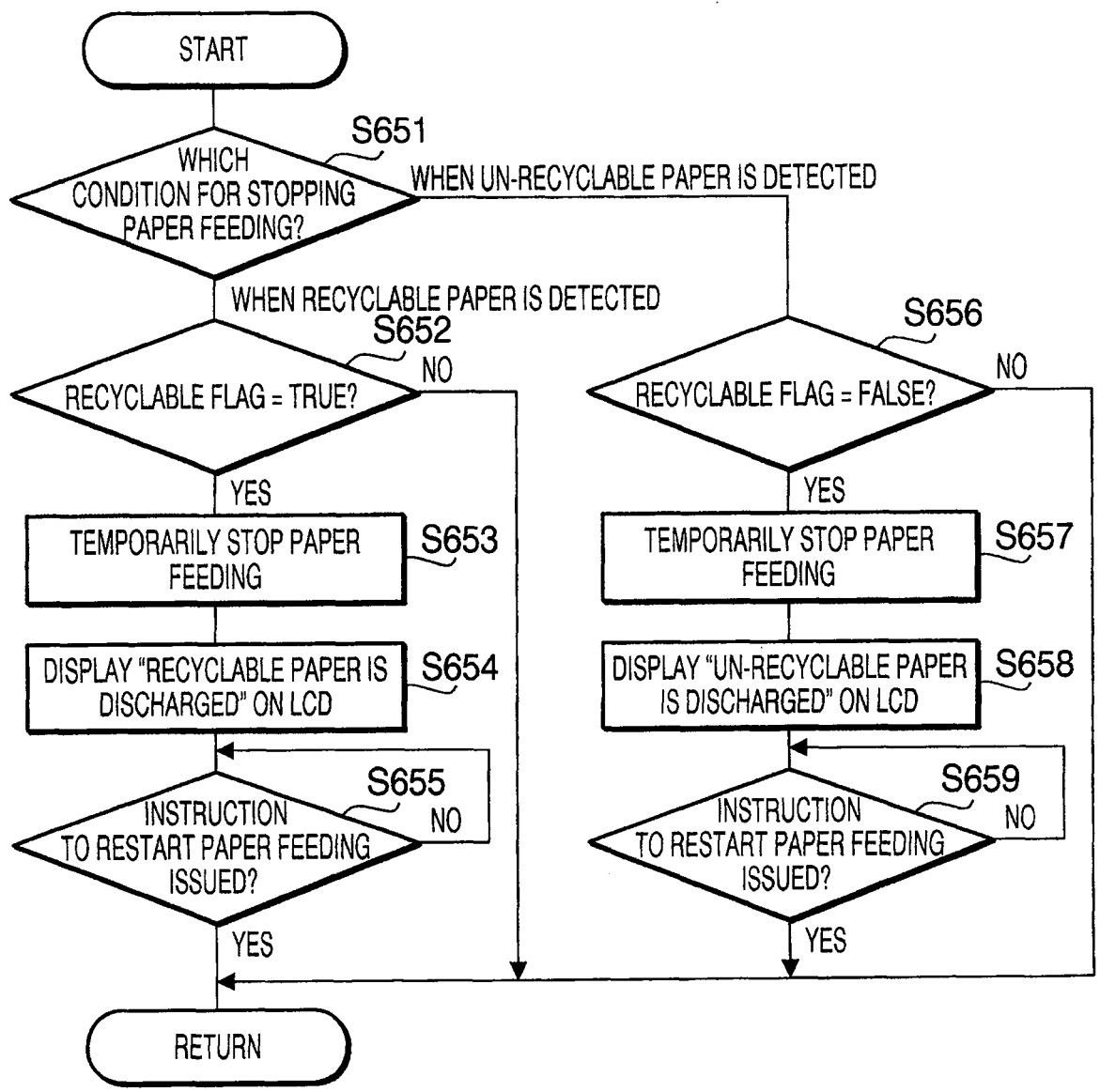
FIG. 8 is a flowchart showing in detail a part of the paper sorting process in the modification according to one or more aspects of the present invention.

In S65, a following stopping process is executed in compliance with the condition for stopping paper feeding set in S53 and the recyclable flag set in S64 or S67. FIG. 8 is a flowchart showing a detailed procedure in S65.

As shown in FIG. 8, in the present process, firstly in S651, it is determined which condition for stopping paper feeding is present between "when a recyclable paper is detected" and "when an un-recyclable paper is detected." When it is determined that the condition for stopping paper feeding is "when a recyclable paper is detected" (S651: when a recyclable paper is detected), the present process goes to S652, in which it is determined whether the recyclable flag is "TRUE." When the recyclable flag is "FALSE," namely, when the paper on which the image has been scanned in S57 and S58 is un-recyclable (S652: No), the present process goes to S66 in FIG. 7, in which it is determined whether a next paper is placed on the loading portion 21. When a next paper is placed on the loading portion 21 (S66: Yes), the present process goes to the aforementioned step S57, in which the same procedure is applied to the next paper.

Meanwhile, back to FIG. 8, when it is determined that the recyclable flag is "TRUE," namely when the paper on which the image has been scanned in S57 and S58 is recyclable (S652: Yes), the present process goes to S653, in which the paper feeding operation is temporarily stopped. In a subsequent step S654, a message "A recyclable paper is discharged" is displayed on the LCD 9A. Thereafter, in S655, the CPU 103 keeps waiting in the standby state until an instruction to restart paper feeding is inputted through the operation panel 9 (S655: No). Then, when the instruction to restart paper feeding is issued (S655: Yes), the present process goes to the aforementioned step S66.

Meanwhile, when the condition for stopping paper feeding is "when an un-recyclable paper is detected" (S651: when an un-recyclable paper is detected), it is determined in S656 whether the recyclable flag is "FALSE." When the recyclable flag is "TRUE," namely when the paper on which the image has been scanned in S57 and S58 is recyclable (S656: No), the present process goes to the aforementioned step S66.

When the recyclable flag is "FALSE," namely when the paper on which the image has been scanned in S57 and S58 is un-recyclable (S656: Yes), the paper feeding operation is temporarily stopped in S657. In a subsequent step S658, a message "An un-recyclable paper is discharged" is displayed on the LCD 9A. Thereafter, the CPU 103 keeps waiting in the standby state until the instruction to restart paper feeding is inputted through the operation panel 9 (S659: No). Then, when the instruction to restart paper feeding is issued (S659: Yes), the present process goes to S66.

In such a paper sorting process, when a paper previously set (recyclable paper or un-recyclable paper) is detected, the paper feeding operation by the automatic document feeding unit 7 is automatically stopped (S653 and S657), and the paper feeding operation can be restarted after the paper is removed (S655 and S659). Therefore, it is possible to easily sort papers. Further, by applying such a paper sorting process, a paper sorting according to aspects of the present invention can be configured with an image scanner that does not include the image forming unit 6. Further, a displaying operation in each S654 and S658 is not necessarily required. Instead, for instance, buttons for selecting one of a recyclable paper detection mode and an un-recyclable detection mode may be provided to the apparatus.

In addition, the aforementioned embodiment and modifications are configured under an assumption of one-side printing, yet the present invention can be applied to the case of double-side printing with a method to determine the printing ratio that is adopted accordingly. For example, when a single side of a paper is only printed, printed areas may be identified on the single side of the paper, and the printing ratio may be determined as a ratio of the printed areas to an area of the single side of the paper. Further, the determination result on the recycling classification may be transmitted to a personal computer via e-mail.

What is claimed is:

1. A paper sorting apparatus configured to determine a recycling classification of a printed paper, comprising:
 a processing unit;
 a scanning unit configured to scan an image printed on the printed paper;
 memory having executable instructions stored thereon that, when executed by the processing unit, cause the processing unit to function as a printing ratio determining unit that determines a printing ratio as a ratio of the number of colored pixels to the number of pixels of a whole area of the image scanned by the scanning unit;
 a classification determining unit that determines a recycling classification of the printed paper between recyclable and unrecyclable based upon whether the printing ratio determined by the printing ratio determining unit is less than a predetermined value; and
 a sorting assist unit that assists sorting of the printed paper in accordance with the recycling classification determined by the classification determining unit, the sorting assist unit including an output unit that outputs information, onto a medium other than the printed paper, that identifies the printed paper and its recycling classification; and
 a paper feeding unit configured to feed the paper with the printed image thereon to be scanned by the scanning unit,
 wherein the sorting assist unit includes a paper feeding stopping unit that stops a paper feeding operation being executed by the paper feeding unit based upon the recycling classification determined by the classification determining unit.

2. The paper sorting apparatus according to claim 1, wherein the output unit outputs, onto the medium other than the printed paper, a list associating the printed paper with the image thereon as scanned by the scanning unit with its recycling classification determined by the classification determining unit.

3. The paper sorting apparatus according to claim 1, wherein the output unit outputs, onto the medium other than the printed paper, a reduced image corresponding to the image scanned by the scanning unit from the printed paper and the recycling classification of the printed paper determined by the classification determining unit.

4. The paper sorting apparatus according to claim 1, further comprising an input unit configured to receive input to set a recycling classification,
 wherein the paper feeding stopping unit stops the paper feeding operation being executed by the paper feeding unit when the recycling classification determined by the classification determining unit is identical to the set recycling classification.

5. The paper sorting apparatus according to claim 1, further comprising:
 an input unit configured to receive an input for restarting the paper feeding operation stopped by the paper feeding stopping unit; and
 wherein the memory has further instructions stored thereon that, when executed by the processing unit, cause the processing unit to function as a paper feeding restarting unit that restarts the paper feeding operation stopped by the paper feeding stopping unit based upon the input received by the input unit.

6. The paper sorting apparatus according to claim 1,
 wherein the memory has further instructions stored thereon that, when executed by the processing unit, cause the processing unit to function as a monochrome determining unit that determines whether the image is a monochrome image based upon colors included in the image scanned by the scanning unit, and
 wherein the classification determining unit determines the recycling classification of the paper based upon a determination made by the monochrome determining unit and the printing ratio determined by the printing ratio determining unit.

7. A paper sorting method for determining a recycling classification of a printed paper, comprising:

scanning an image printed on the printed paper;

a printing ratio determining step of determining a printing ratio as a ratio of the number of colored pixels to the number of pixels of a whole area of the image scanned by the scanning;

a classification determining step of determining a recycling classification of the printed paper between recyclable and unrecyclable based upon whether the printing ratio determined in the printing ratio determining step is less than a predetermined value; and a sorting assist step of assisting sorting of the printed paper in accordance with the recycling classification determined in the classification determining step, the sorting assist step including an outputting step for outputting information, onto to a medium other than the printed paper, that identifies the printed paper and its recycling classification; and stopping a paper feed operation based upon the recycling classification determined in the classification determining step.

8. A non-transitory computer readable medium having computer readable instructions stored thereon, which, when executed, cause a computer to perform:

scanning an image printed on the printed paper;

a printing ratio determining step of determining a printing ratio as a ratio of the number of colored pixels to the number of pixels of a whole area of the image scanned by the scanning;

a classification determining step of determining a recycling classification of the printed paper between recyclable and unrecyclable based upon whether the printing ratio determined in the printing ratio determining step is less than a predetermined value; and a sorting assist step of assisting sorting of the printed paper in accordance with the recycling classification determined in the classification determining step, the sorting assist step including an outputting step for outputting information, onto to a medium other than the printed paper, that identifies the printed paper and its recycling classification; and stopping a paper feed operation based upon the recycling classification determined in the classification determining step.

* * * * *